US010661861B2

(12) United States Patent
Daniel et al.

(10) Patent No.: US 10,661,861 B2
(45) Date of Patent: May 26, 2020

(54) APPARATUS FOR COUPLING A FLOTATION DEVICE TO A BOAT

(71) Applicants: Chad Daniel, Houston, TX (US); Carl Allen Beeler, Houston, TX (US)

(72) Inventors: Chad Daniel, Houston, TX (US); Carl Allen Beeler, Houston, TX (US)

( * ) Notice: Subject to any disclaimer, the term of this patent is extended or adjusted under 35 U.S.C. 154(b) by 0 days.

(21) Appl. No.: 16/129,973

(22) Filed: Sep. 13, 2018

(65) Prior Publication Data
US 2019/0077489 A1 Mar. 14, 2019

Related U.S. Application Data

(60) Provisional application No. 62/558,119, filed on Sep. 13, 2017.

(51) Int. Cl.
*B63B 17/00* (2006.01)
*B63B 23/30* (2006.01)
*F16M 13/02* (2006.01)
*B63B 29/04* (2006.01)

(52) U.S. Cl.
CPC ............. *B63B 23/30* (2013.01); *F16M 13/02* (2013.01); *F16M 13/022* (2013.01); *B63B 2017/0054* (2013.01); *B63B 2029/043* (2013.01)

(58) Field of Classification Search
CPC ... B63B 23/30; B63B 2029/043; B63B 43/02; B63B 43/10; B63B 43/04; B63B 2001/102; B63B 2001/1186; B63B 2017/0054; B63B 2043/02; B63B 2043/04; B63B 2043/014; B63B 2207/00; B63B 2207/02; B63B 2221/20; B63B 2221/24; B63B 2731/00; B63B 43/14; B63B 1/14; B41L 47/02; F16M 13/02
USPC ....... 114/122, 123, 267, 278, 283, 284, 343, 114/364
See application file for complete search history.

(56) References Cited

U.S. PATENT DOCUMENTS

| | | | | |
|---|---|---|---|---|
| 1,663,888 | A * | 3/1928 | Osten ...................... | B63B 43/04 114/123 |
| 2,596,194 | A * | 5/1952 | Anderson ............... | B63B 43/14 114/123 |
| 4,947,777 | A * | 8/1990 | Yoder ..................... | A01K 91/08 114/221 R |
| 6,050,210 | A * | 4/2000 | Grzybowski ........... | B63B 43/14 114/123 |
| 6,305,306 | B1 * | 10/2001 | Grzybowski ............. | B63B 1/14 114/123 |
| 6,659,032 | B1 * | 12/2003 | Simon ..................... | B63B 43/14 114/123 |
| 8,939,103 | B2 * | 1/2015 | Wong ...................... | B63B 43/14 114/123 |

* cited by examiner

*Primary Examiner* — Daniel V Venne
(74) *Attorney, Agent, or Firm* — Foley & Lardner LLP

(57) ABSTRACT

Described herein is an apparatus for coupling a flotation device to a boat. The apparatus includes a clamping device with a clamp base, a fixed clamp portion extending from the clamp base, and an extensible clamp portion extendably coupled to the clamp base. Extension of the extensible clamp portion changes a distance between the extensible clamp portion and the fixed clamp portion so as to permit clamping of a portion of the boat there between. A tether member extends downwardly from the base. A retention device is associated with the tether member and operates to couple the flotation device to the boat.

25 Claims, 5 Drawing Sheets

APPARATUS FOR COUPLING A FLOTATION DEVICE TO A BOAT

PRIOR RELATED APPLICATIONS

This application claims benefit of U.S. Provisional Patent Application Ser. No. 62/558,119 entitled "Apparatus for Coupling a Flotation Device to a Boat," filed on Sep. 13, 2017.

FEDERALLY SPONSORED RESEARCH STATEMENT

N/A

REFERENCE TO MICROFICHE APPENDIX

N/A

FIELD OF INVENTION

The invention relates to an apparatus that securely attaches a flotation device to a boat and that retains the flotation device close to the boat.

BACKGROUND OF THE INVENTION

The popularity of recreational activities in and around bodies of water, such as lakes and the ocean, is ever increasing. Similarly, the popularity of boating in such bodies of water is also increasing. In addition to boat owners enjoying the act of piloting their boats, many enjoy congregating with other boaters at sandbars, small islands, and marinas. During such congregations, or sometimes when alone, some boaters enjoy floating in the water near their boat with the aid of a flotation device.

However, it is necessary for the flotation device to be attached or tethered to the boat in some fashion so that the boater does not drift too far astray from the boat, which could lead to an unsafe scenario, or simply an undesirably long swim back toward the boat. Therefore, boaters commonly tie a rope to an attachment point on their boat and to their flotation device. While this does have the desired effect of ensuring that the boater does not drift too far from the boat, it is an inelegant solution, and may still be unable to retain the boater as close to the boat as desired, for example to allow easy passage of beverages from an individual in the boat to the boater in or on the flotation device.

Therefore, due to the problems discussed above, further development of new devices of attaching flotation devices to boats is needed.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Described herein is an apparatus for coupling a flotation device to a boat. The apparatus includes a clamping device with a clamp base, a fixed clamp portion extending from the clamp base, and an extensible clamp portion extendably coupled to the clamp base. Extension of the extensible clamp portion changes a distance between the extensible clamp portion and the fixed clamp portion so as to permit clamping of a portion of the boat there between. A tether member extends downwardly from the base. A retention device is associated with the tether member and operates to couple the flotation device to the boat.

In some cases, the portion of the boat which is clamped may be a gunwale. The extensible clamp portion may extend outwardly from the clamp base. In some cases, the extensible clamp portion may instead extend upwardly from the clamp base to an upper interior surface of the fixed clamp portion, and the fixed clamp portion may extend downwardly from the clamp base such that extension of the extensible clamp portion toward the upper interior surface of the fixed clamp portion serves to clamp the swim platform between the fixed clamp portion and the extensible clamp portion.

In other cases, the portion of the boat which is clamped may be a swim platform. The extensible clamp portion may extend upwardly from the clamp base to an upper interior surface of the fixed clamp portion. The fixed clamp portion may extend downwardly from the clamp base such that extension of the extensible clamp portion toward the upper interior surface of the fixed clamp portion serves to clamp the swim platform between the fixed clamp portion and the extensible clamp portion.

The retention device may be a terminating member coupled to the tether member, and may have a diameter, length, or with greater than that of the tether member.

The flotation device may have a connector attached thereto, and the connector may have a passageway defined there through that receives the tether member to thereby couple the flotation device to the boat. The flotation device may be a chair, and the connector may be positioned on an outside surface of a back of the chair. The passageway may be greater in diameter than the tether member to allow sliding movement between the passageway and the tether member, thereby permitting relative movement between the boat and the chair.

In some cases, the flotation device may be a raft.

The tether member may be a fixed portion extending downwardly from the clamp base, and an adjustable portion extending slidingly downward from the fixed portion.

The fixed clamp portion may extend downwardly from the clamp base, and the extensible clamp portion may include an extensible shaft and a clamp arm extending downwardly from a distal end of the extensible shaft. The fixed clamp portion may have a first compressible cushioning member affixed thereto on a side thereof facing a second compressible cushioning member affixed thereto on a side thereof.

The base may have a passageway defined therein to receive a proximal end of the tether member, the passageway being sized and dimensioned so as to form a friction fit with the tether member.

The base and tether member may be integrally formed as a monolithic unit.

The tether member may be rigid and constructed from a material such as metal or plastic.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present invention, reference should be made to the following detailed disclosure, taken in conjunction with the accompanying drawings, in which like parts are given like reference numerals, and wherein.

DETAILED DESCRIPTION OF EMBODIMENTS OF THE INVENTION

The following discussion is presented to enable a person skilled in the art to make and use the subject matter disclosed herein. The detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Apparatus and Clamping Device

Figure 1:
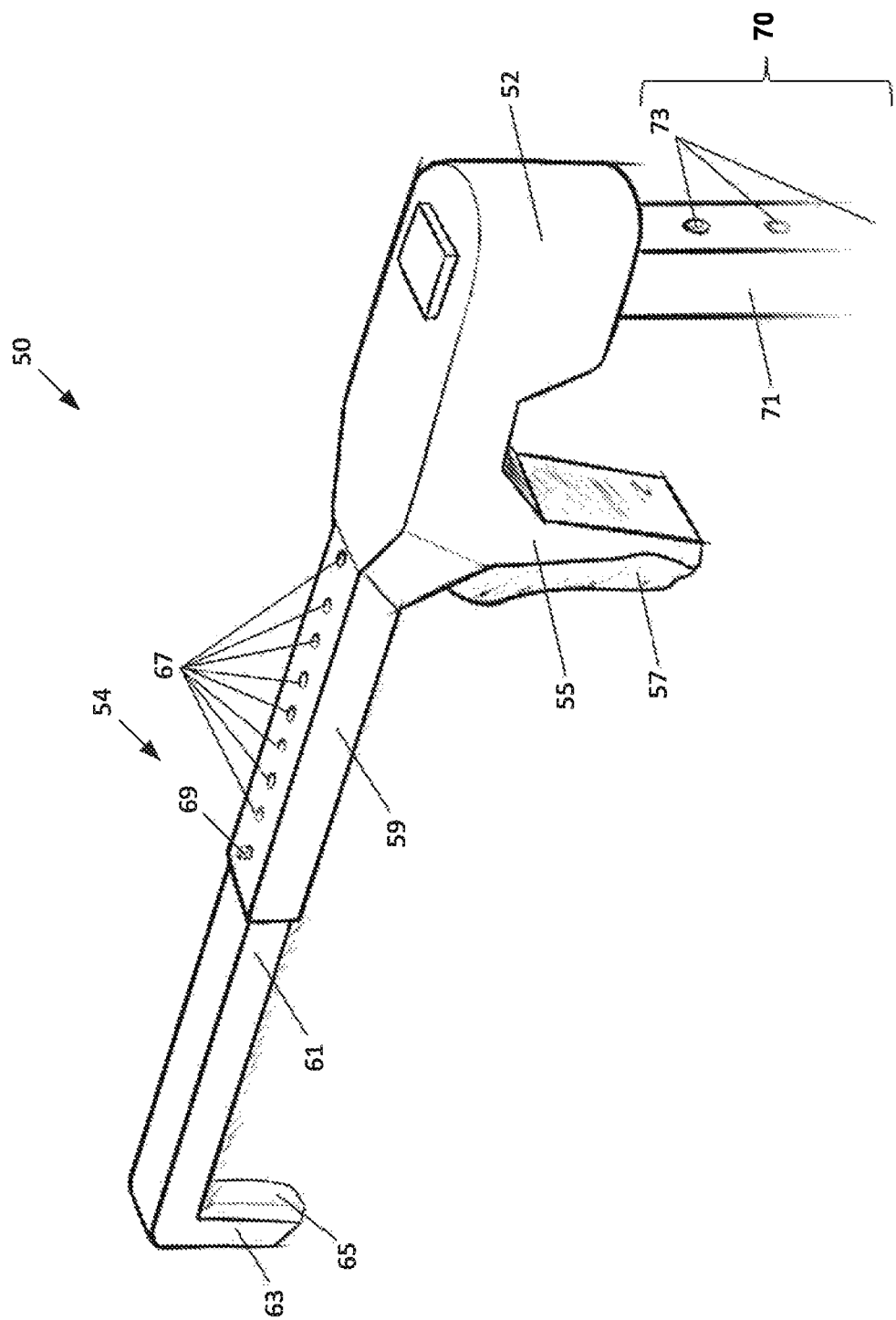
FIG. 1 is a perspective view of a clamping device of an apparatus for coupling a flotation device to a boat described herein.
Figure 2:
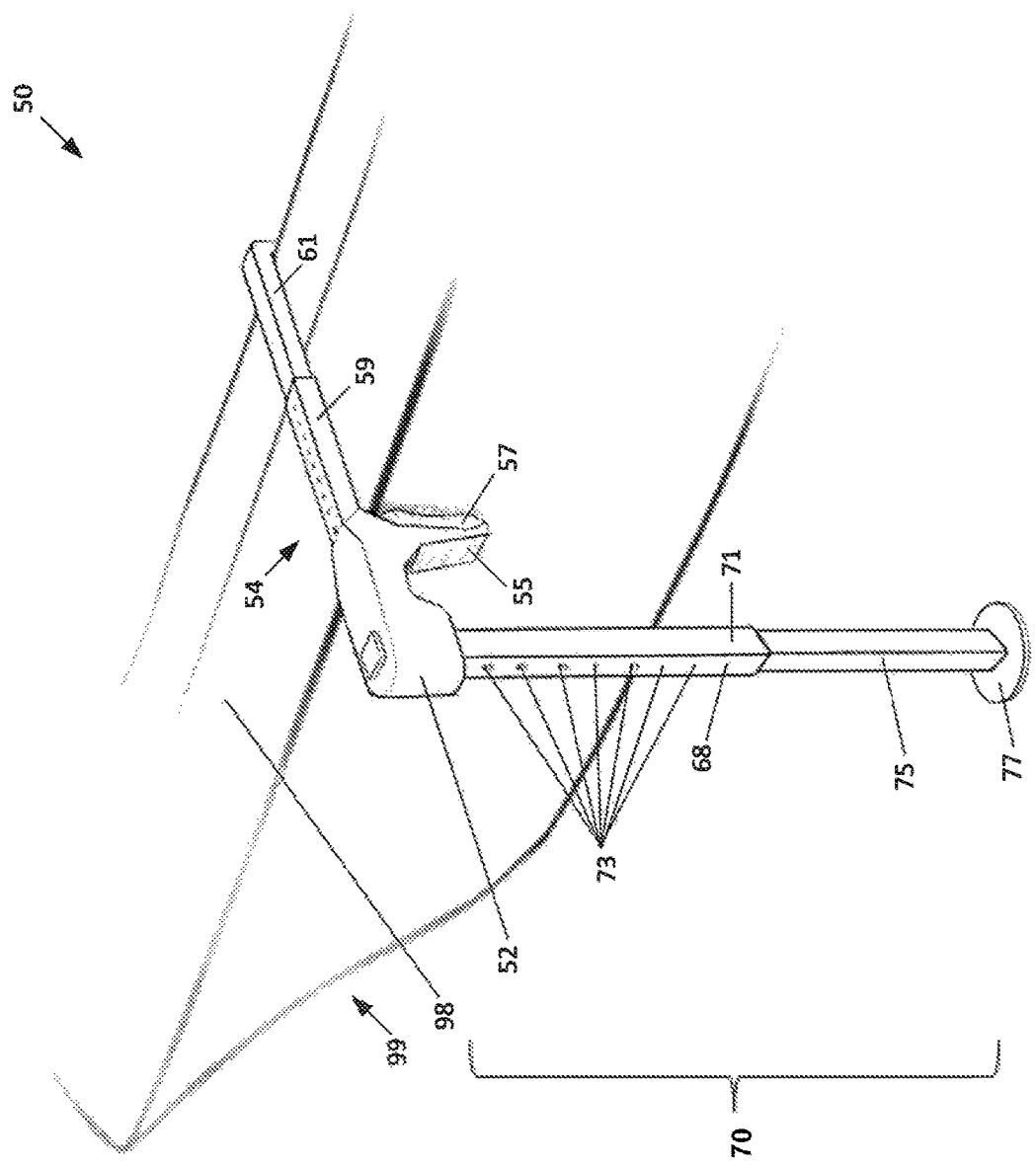
FIG. 2 is a perspective view of the apparatus described herein coupled to a gunwale of a boat.

With initial reference to FIGS. 1-2, an apparatus 50 for coupling a flotation device (see e.g., FIGS. 5A-5C) to a boat 99 is now described. In an embodiment, the apparatus 50 includes a clamping device 54 to clamp to the boat 99 (FIG. 2 shows the clamping device 54 as being clamped to the gunwale 98 of the boat 99), with a tether member 70 extending downwardly from the clamping device 54 and terminating in a retention device 77.

In an embodiment, the clamping device 54 includes a clamp base 52 which is carried by the tether member 70. In an embodiment, the clamp base 52 has a hole formed therein that receives the tether member 70 in a friction fit arrangement to couple the two together.

In an embodiment, a first fixed clamp portion 55 extends downwardly from the clamp base 52, and a first extensible clamp portion 59 extends outwardly from the clamp base 52.

In an embodiment, a second extensible clamp portion 61 extends from the first extensible clamp portion 59 in a sliding arrangement therewith, and can be adjustably extended or retracted, then held in place by projection 69 fitting into a desired hole 67 defined in the first extensible clamp portion 59.

In an embodiment, a second fixed clamp portion 63 extends downwardly from the second extensible clamp portion 61, and extension or retraction of the second extensible clamp portion 61 serves to change the distance between the first extensible clamp portion 59 and second extensible clamp portion 63, thereby permitting clamping to a desired portion of the boat 99. In this embodiment, soft padding material 57 and 65 may cover the first fixed clamp portion 55 and/or the second fixed clamp portion 63 so as to protect the boat 99 from cosmetic damage when the clamping device 54 is clamped thereto.

In an embodiment, the tether member 70 includes a first portion 71 that slidingly receives a second portion 75.

In an embodiment, a series of holes 73 are defined in the first portion 71 so as to permit retention of the second portion 75 within the first portion 71 by button 68.

In an embodiment, the second portion 75 can be adjustably extended or retracted from the first portion 71, thereby permitting adjustment of the overall length of the tether member 70.

Alternate Apparatus and Clamping Devices

Although one specific design for the clamping device 54 has been described with respect to FIGS. 1-2, it should be appreciated that any suitable design for the clamping device 54 may be used.

Figure 3:
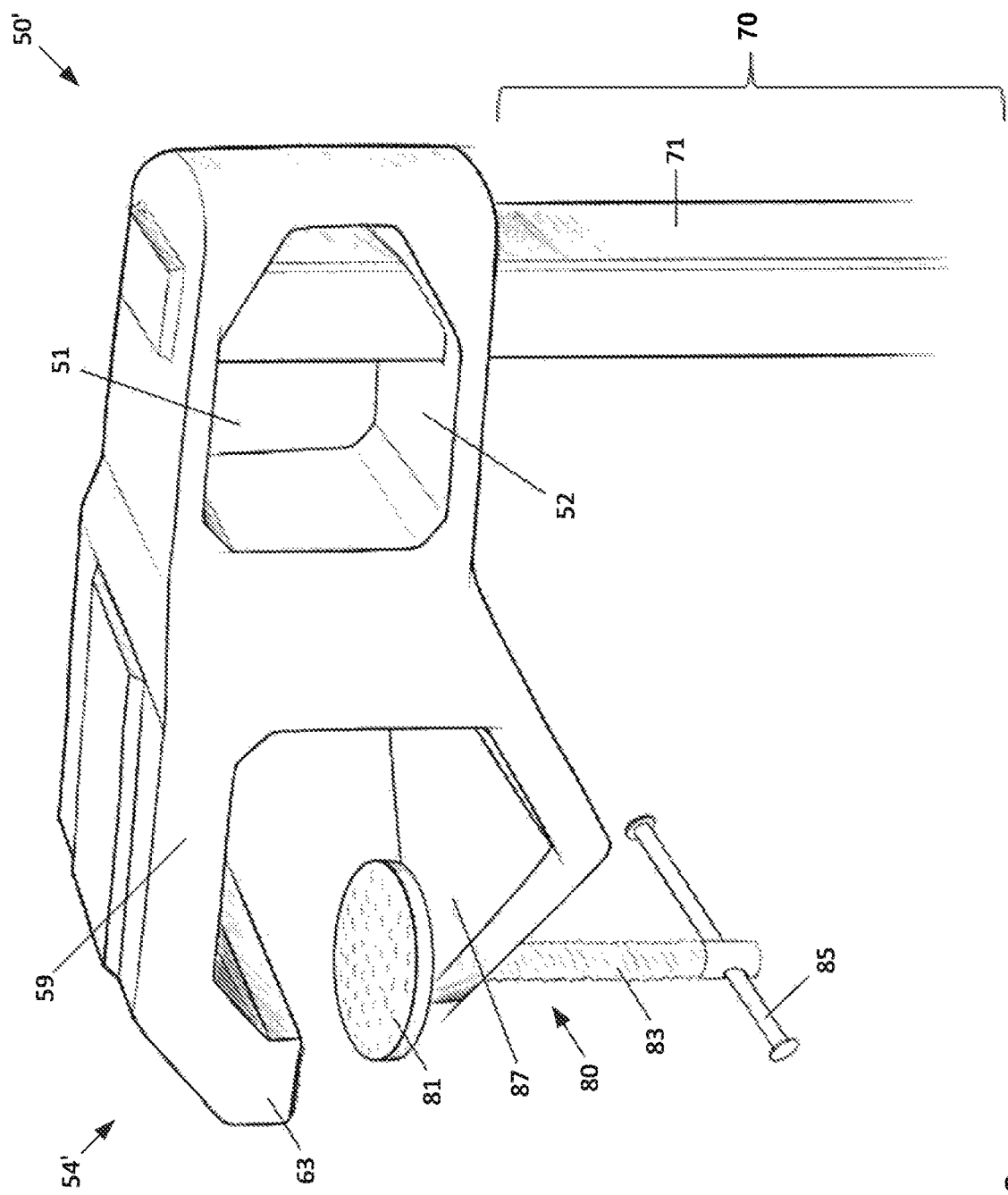
FIG. 3 is a perspective view of an alternative version of the clamping device of the apparatus described herein.
Figure 4:
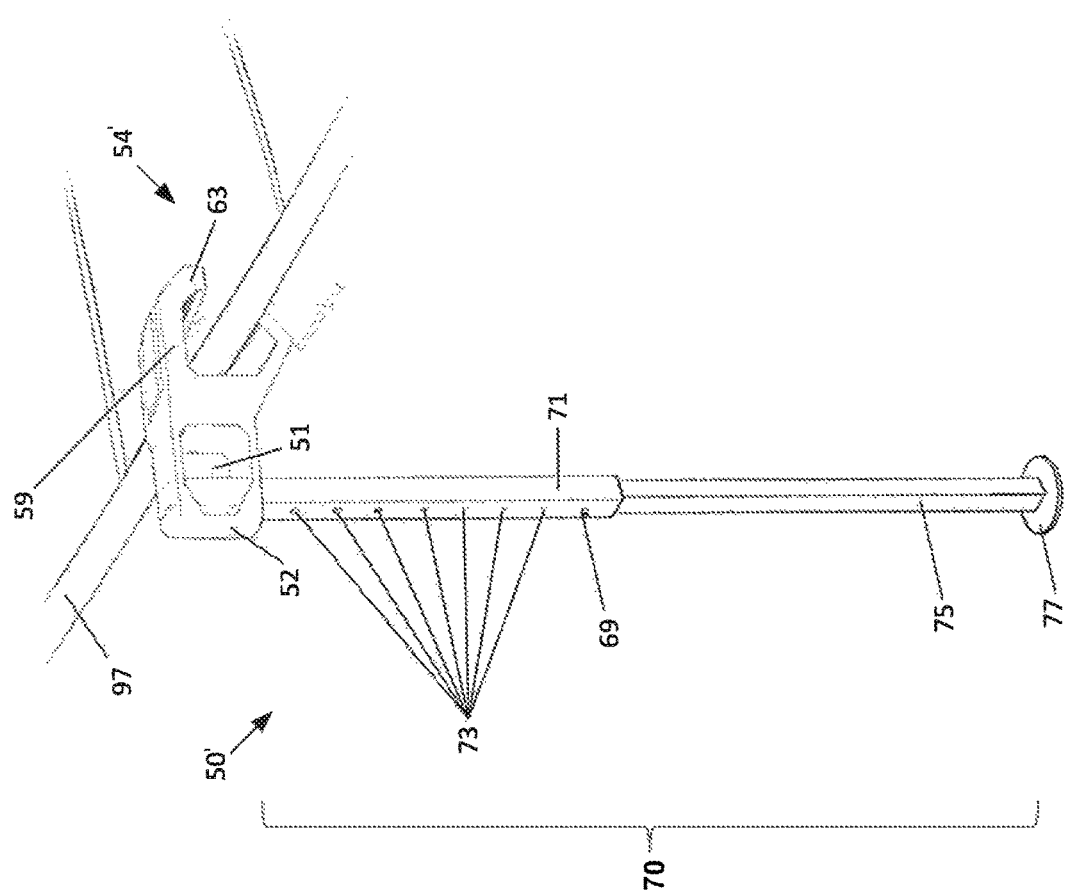
FIG. 4 is a perspective view of the apparatus described herein coupled to a swim platform of a boat.

With reference to FIGS. 3-4, an alternative apparatus 50' for coupling a flotation device (see e.g., FIGS. 5A-5C) to a boat 99 is now described. In an embodiment, the apparatus 50' includes an alternative clamping device 54' to clamp to the boat 99, with a tether member 70 extending downwardly from the clamping device 54' and terminating in a retention device 77. In an embodiment, the clamping device 54' includes a clamp base 52 which is carried by the tether member 70. In an embodiment, the clamp base 52 has a hole formed therein that receives the tether member 70 in a friction fit arrangement to couple the two together.

In an embodiment, a fixed clamp portion 63 extends downwardly from the clamp portion 59.

In an embodiment, an extensible clamp portion 80 extends upwardly from an outwardly extending portion 87 of the clamp base 52.

In an embodiment, the extensible clamp portion 80 includes a head 81 mounted on a threaded screw 83 that may be extended or retracted toward or away from the upper interior surface of the fixed clamp portion 63 via being turned clockwise or counter clockwise by the handle 85. Thus, by extending the extensible clamp portion 80 toward the upper interior surface of the fixed clamp portion 63, a portion of the boat 99 may be securely clamped by the clamping device 54, securing the apparatus 50 to the boat 99. In this embodiment, soft padding material may cover the extensible clamp portion 80 and/or the fixed clamp portion 63 so as to protect the boat 99 from cosmetic damage when the clamping device 54' is clamped thereto.

In an embodiment, the tether member 70 includes a first portion 71 that slidingly receives a second portion 75.

In an embodiment, a series of holes 73 are defined in the first portion 71 so as to permit retention of the second portion 75 within the first portion 71 by button 68.

In an embodiment, the second portion 75 can be adjustably extended or retracted from the first portion 71, thereby permitting adjustment of the overall length of the tether member 70.

With reference to FIGS. 3-4, another alternative apparatus 50' for coupling a flotation device (see e.g., FIGS. 5A-5C) to a boat 99 is also described. As shown in FIGS. 3-4, the clamp base 52 may have a hole 51 formed therein to reduce weight, as well as to reduce the amount of material used in construction thereof.

Examples of Boat Configurations

As shown in FIG. 2, the boat 99 may include a gunwale 98 to which the clamping device is clamped. In this embodiment, a soft padding material 57 and 65 may cover the first fixed clamp portion 55 and/or the second fixed clamp portion 63 so as to protect the boat 99 from cosmetic damage when the clamping device 54 is clamped thereto.

As shown in FIG. 4, the boat 99 may include a swim platform 97 to which the clamping device 54 is clamped. In this embodiment, a soft padding material may cover the extensible clamp portion 80 and/or the fixed clamp portion 63 so as to protect the boat 99 from cosmetic damage when the clamping device 54 is clamped thereto.

Examples of Flotation Devices

Figure 5C:
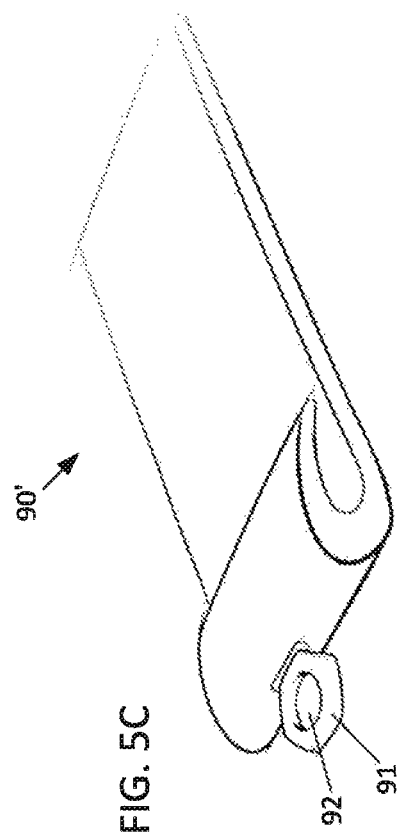
FIG. 5C is a perspective view of a raft flotation device usable with the apparatus described herein.
Figure 5B:
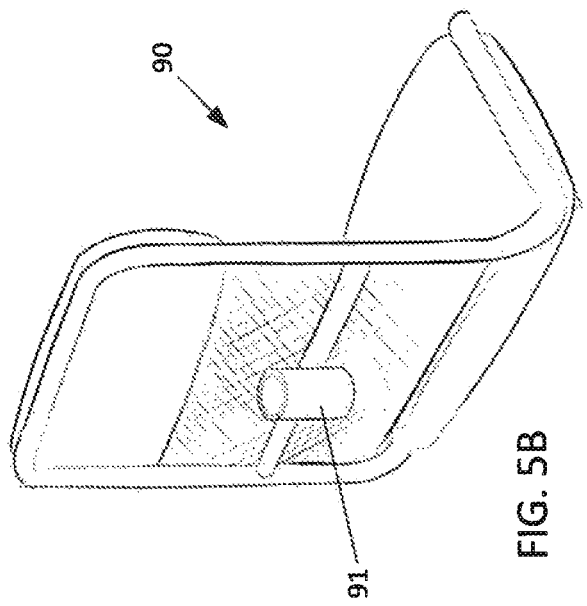
FIG. 5B is a rear perspective view of the chair flotation device of FIG. 5A.
Figure 5A:
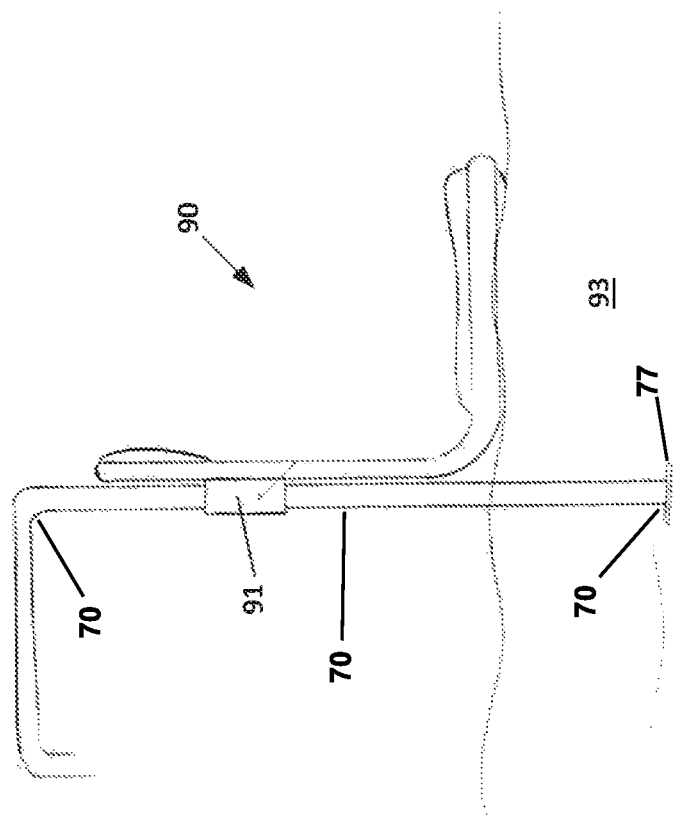
FIG. 5A is a side view of a chair flotation device as used with the apparatus described herein.

With reference to FIGS. 5A-5C, variations of the flotation device 90 and 90' may be used with the apparatus 50.

As shown in FIGS. 5A-5B, the flotation device 90 may be a chair. In an embodiment, the chair variant of the flotation device 90 has a receptacle 91 attached thereto that receives the tether member 70.

In an embodiment, the receptacle 91 has an inner diameter larger than the outer diameter of the tether member 70 so as to permit the receptacle 91 and tether member 70 to freely move relative to one another. Thus, as the boat 99 bobs in the water 93 at a different rate than the chair 90, the boat 99 does not pull the chair 90 out of the water 03 or under the water 93.

In an embodiment, the retention device 77 has a diameter that is greater than the inner diameter of the receptacle 91 such that the receptacle 91 is captured and unable to slip free of the tether member 70. Thus, the flotation device 90 is retained securely by the apparatus 50 in close spatial relation to the boat 99.

In an embodiment, the receptacle 91 may take the form of a cylinder, which has a longitudinal axis that is longer than its diameter.

As shown in FIG. 5C, the flotation device 90' may be a raft instead of a chair. In an embodiment, the raft variant of the flotation device 90' also has a receptacle 91 attached thereto that receives the tether member 70.

In an embodiment, the receptacle 91 takes the form of a grommet that has a longitudinal axis that is shorter than its diameter.

It should be noted that other types of clamping devices 54 may be used, and that this disclosure envisions any number of such suitable clamping devices. It should also be noted that the tether member 70 is relatively rigid, constructed from a material such as metal or plastic, to assist with retaining the flotation device 90 in the aforementioned close spatial relation to the boat 99.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims. The invention is specifically intended to be as broad as the claims below and their equivalents.

Definitions

As used herein, the terms "a," "an," "the," and "said" means one or more, unless the context dictates otherwise.

As used herein, the term "about" means the stated value plus or minus a margin of error or plus or minus 10% if no method of measurement is indicated.

As used herein, the term "or" means "and/or" unless explicitly indicated to refer to alternatives only or if the alternatives are mutually exclusive.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the phrase "consisting of" is a closed transition term used to transition from a subject recited before the term to one or more material elements recited after the term, where the material element or elements listed after the transition term are the only material elements that make up the subject.

INCORPORATION BY REFERENCE

All patents and patent applications, articles, reports, and other documents cited herein are fully incorporated by reference to the extent they are not inconsistent with this invention.

What is claimed is:

1. An apparatus for coupling a flotation device to a boat, the apparatus comprising:
    a clamping device including a clamp base, a fixed clamp portion extending from the clamp base, and an extensible clamp portion extendably coupled to the clamp base, wherein extension of the extensible clamp portion changes a distance between the extensible clamp portion and the fixed clamp portion so as to permit clamping of a portion of the boat there between;
    a tether member extending downwardly from the clamp base;
    a retention device coupled to the tether member; and
    wherein the clamp base has a passageway defined therein to receive a proximal end of the tether member, the passageway being sized and dimensioned so as to form a friction fit with the tether member.

2. The apparatus of claim 1, wherein the portion of the boat is a gunwale; and wherein the extensible clamp portion extends outwardly from the clamp base.

3. The apparatus of claim 1, wherein the portion of the boat is a swim platform; and wherein the extensible clamp portion extends upwardly from the clamp base to an upper interior surface of the fixed clamp portion.

4. The apparatus of claim 3, wherein the fixed clamp portion extends downwardly from the clamp base such that extension of the extensible clamp portion toward the upper interior surface of the fixed clamp portion serves to clamp the swim platform between the fixed clamp portion and the extensible clamp portion.

5. The apparatus of claim 1, wherein the portion of the boat is a gunwale; wherein the extensible clamp portion extends upwardly from the clamp base to an upper interior surface of the fixed clamp portion; and wherein the fixed clamp portion extends downwardly from the clamp base such that extension of the extensible clamp portion toward the upper interior surface of the fixed clamp portion serves to clamp the swim platform between the fixed clamp portion and the extensible clamp portion.

6. The apparatus of claim 1, wherein the retention device has a diameter, length, or width greater than that of the tether member.

7. The apparatus of claim 1, wherein the flotation device has a connector attached thereto, the connector having a passageway defined there through that receives the tether member to thereby couple the flotation device to the boat.

8. The apparatus of claim 7, wherein the flotation device is a chair, and wherein the connector is positioned on an outside surface of a back of the chair; wherein the passageway is greater in diameter than the tether member to allow sliding movement between the passageway and the tether member, thereby relative movement between the boat and the chair.

9. The apparatus of claim 1, wherein the flotation device is a raft.

10. The apparatus of claim 1, wherein the tether member comprises a fixed portion extending downwardly from the clamp base, and an adjustable portion extending slidingly downward from the fixed portion.

11. The apparatus of claim 1, wherein the fixed clamp portion extends downwardly from the clamp base; wherein the extensible clamp portion includes an extensible shaft and a clamp arm extending downwardly from a distal end of the extensible shaft.

12. The apparatus of claim 11, wherein the portion of the boat is a gunwale; wherein the fixed clamp portion has a first compressible cushioning member affixed thereto on a side thereof facing the gunwale; and wherein the clamp arm has a second compressible cushioning member affixed thereto on a side thereof facing the gunwale.

13. The apparatus of claim 1, wherein the clamp base and tether member are integrally formed as a monolithic unit.

14. The apparatus of claim 1, wherein the tether member is rigid.

15. An apparatus for coupling a flotation device to a boat, the apparatus comprising:
a clamping device including a clamp base, a fixed clamp portion extending from the clamp base, and an extensible clamp portion extendably coupled to the clamp base, wherein extension of the extensible clamp portion changes a distance between the extensible clamp portion and the fixed clamp portion;
a tether member extending downwardly from the clamp base;
a retention device coupled to the tether member;
a flotation device configured to be coupled to the tether member and to be retained coupled thereto by the retention device;
wherein the extensible clamp portion extends upwardly from the clamp base to an upper interior surface of the fixed clamp portion; and
wherein the fixed clamp portion extends downwardly from the clamp base toward an upper interior surface of the extensible clamp portion.

16. The apparatus of claim 15, wherein the extensible clamp portion extends outwardly from the clamp base.

17. The apparatus of claim 15, wherein the retention device has a diameter, length, or width greater than that of the tether member.

18. The apparatus of claim 15, wherein the flotation device has a connector attached thereto, the connector having a passageway defined there through that receives the tether member to thereby couple the flotation device to the tether member.

19. The apparatus of claim 18, wherein the flotation device is a chair, and wherein the connector is positioned on an outside surface of a back of the chair; wherein the passageway is greater in diameter than the tether member to allow sliding movement between the passageway and the tether member, thereby permitting relative movement between the tether member and the chair.

20. The apparatus of claim 15, wherein the tether member comprises a fixed portion extending downwardly from the clamp base, and an adjustable portion extending slidingly downward from the fixed portion.

21. The apparatus of claim 15, wherein the fixed clamp portion extends downwardly from the clamp base; wherein the extensible clamp portion includes an extensible shaft and a clamp arm extending downwardly from a distal end of the extensible shaft.

22. The apparatus of claim 21, wherein the fixed clamp portion has a first compressible cushioning member affixed thereto on a side thereof facing the clamp arm; and
wherein the clamp arm has a second compressible cushioning member affixed thereto on a side thereof facing the fixed clamp portion.

23. The apparatus of claim 15, wherein the clamp base has a passageway defined therein to receive a proximal end of the tether member, the passageway being sized and dimensioned so as to form a friction fit with the tether member.

24. The apparatus of claim 15, wherein the clamp base and tether member are integrally formed as a monolithic unit.

25. The apparatus of claim 15, wherein the tether member is rigid.

* * * * *